United States Patent
Ju et al.

(10) Patent No.: US 7,532,086 B2
(45) Date of Patent: May 12, 2009

(54) DIGITAL ATTENUATION APPARATUS HAVING ULTRA BROADBAND AND EXCELLENT ATTENUATION CHARACTERISTICS

(75) Inventors: In-Kwon Ju, Daejon (KR); In-Bok Yom, Daejon (KR); Dong-Pil Chang, Daejon (KR); Jin-Cheol Jeong, Daejon (KR); Dong-Hwan Shin, Daejon (KR); Youn-Sub Noh, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 12/066,728

(22) PCT Filed: Aug. 31, 2006

(86) PCT No.: PCT/KR2006/003466

§ 371 (c)(1),
(2), (4) Date: Mar. 13, 2008

(87) PCT Pub. No.: WO2007/032611

PCT Pub. Date: Mar. 22, 2007

(65) Prior Publication Data

US 2008/0224801 A1   Sep. 18, 2008

(30) Foreign Application Priority Data

Sep. 14, 2005   (KR) .................. 10-2005-0085903

(51) Int. Cl.
*H03H 7/25* (2006.01)
(52) U.S. Cl. .................... 333/81 A; 327/308
(58) Field of Classification Search ............ 333/81 A; 327/308, 309
See application file for complete search history.

(56) References Cited

U.S. PATENT DOCUMENTS

| | | | |
|---|---|---|---|
| 4,978,932 A | 12/1990 | Gupta et al. | |
| 5,049,841 A | 9/1991 | Cooper et al. | |
| 5,309,048 A | 5/1994 | Khabbaz | |
| 5,448,207 A | 9/1995 | Kohama | |
| 5,666,089 A | 9/1997 | Ehlers | |
| 6,040,732 A | 3/2000 | Brokaw | |
| 6,448,867 B1 | 9/2002 | Kossor | |
| 6,828,873 B2 * | 12/2004 | Ludwig et al. | 333/81 R |
| 6,922,115 B2 | 7/2005 | Chaki | |

OTHER PUBLICATIONS

Khabbaz et al., DC-to-20-GHz MMIC Multibit Digital Attenuators with On-Chip TL Control, IEEE Journal of Solid-State Circuits, vol. 27, No. 10, Oct. 1992, p. 1457-1462.

McGrath et al., An Ultra Broadband DC-12GHz 4-Bit GaAs Monolithic Digital Attenuator, IEEE, 1991, GaAs IC Symposium, p. 247-250.

(Continued)

*Primary Examiner*—Stephen E Jones
(74) *Attorney, Agent, or Firm*—Rabin & Berdo, P.C.

(57) ABSTRACT

Provided is a digital attenuation apparatus having ultra broadband and excellent attenuation characteristics. The digital attenuation apparatus includes an input port, an output port, a first transmission line, a second transmission line, a first switching device, a third transmission line, a first resistive element, a second resistive element, a fourth transmission line, a second switching device, a fifth transmission line, and a third resistive element.

13 Claims, 7 Drawing Sheets

OTHER PUBLICATIONS

Krafcsi et al., Broadband, Low-Loss 5- and 6-Bit Digital Attenuators, 1995 IEEE, MIT-S Digest, p. 1627-1630.

Sarkissian et al., A Ku-Band 6-Bit Digital Attenuator With Integrated Serial to Parallel Converter, 1999 IEEE, MIT-S Digest, p. 1915-1918.

Sjogren et al., A low Phase-Error 44-GHz HEMT Attenuator, IEEE Microwave and Guided Wave Letters, vol. 8, No. 5, May 1998, p. 194-195.

* cited by examiner

DIGITAL ATTENUATION APPARATUS HAVING ULTRA BROADBAND AND EXCELLENT ATTENUATION CHARACTERISTICS

TECHNICAL FIELD

The present invention relates to a digital attenuation apparatus, and more particularly, to a digital attenuation apparatus having ultra broadband and excellent attenuation characteristics using an efficient attenuation structure with optimized transmission line parameters and resistance values.

BACKGROUND ART

It is known that an attenuator literally refers to a device/circuit used for attenuating power. For example, a power can be attenuated as desired by employing diverse consumptive elements such as resistors. There has been frequently used a technique that divides a power through a resistor network or an array of resistors and makes a portion of the distributed power terminated.

Generally, such attenuators are classified into a fixed attenuator having a fixed attenuation amount and a variable attenuator having an arbitrarily adjustable attenuation amount.

The fixed attenuator for intentional attenuation should be designed to maximally suppress issuance of noise above a certain amount and also not to incur a phase difference since it is used only for the purpose of lowering power level in diverse cases.

This fixed attenuator is used in various ways. In many cases, the fixed attenuator is utilized for fitting power levels of plural stages to a required level; and especially used to measure an output of a high output device such as a power amplifier. If a high output of tens of dBm or more is directly input to a measuring device, such device may be damaged. Therefore, it is possible to safely use the measuring device if an output value is measured with an attenuator having an accurately known amount of attenuation prepared at an output stage and then compensated in a numerical expression.

On the other hand, the variable attenuator is employed for a power control, a gain control, temperature compensation and so on because a user can arbitrarily change magnitude of Radio Frequency (RF)/microwave signal in transceivers of various wireless communication systems such as a personal communication system, a military communication system, a satellite communication system, etc.

A high frequency variable attenuator can be implemented in a type of an analog or digital attenuator.

An amount of attenuation of the analog attenuator is varied nonlinearly with respect to an amount of a control voltage and current; and therefore, there is a problem that a complicated control circuit is needed to control the amount of attenuation thereof accurately. Another problem is that the amount of attenuation is largely varied due to sensitivity to the temperature and manufacturing process.

Meanwhile, the digital attenuator has high linearity and is strong to high power, even under conditions of a wide operating temperature range and a large variation of manufacturing process of Monolithic Microwave Integrated Circuit (MMIC), compared to the analog attenuator. Also, the digital attenuator is preferred to the analog attenuator owing to easiness of control of the attenuation amount and its accuracy.

This digital attenuator is configured in units of 1 dB, 2 dB, 4 dB and 8 dB, etc., connected in series, each of which forms an individual bit and is switched to obtain a desired amount of attenuation. For the switching of the individual bit, a switching device is used. As such switching devices, there exist a Field Effect Transistor (FET) and a High Electron Mobility Transistor (HEMT), wherein a resistance between a drain terminal and a source terminal is controlled in a range from several ohms to several Kilo ohms by a voltage applied to a gate terminal.

The serial bits provided by those switching devices are weighted in a binary way starting from the Least Significant Bit (LSB), which is minimum resoluble level. The Most Significant Bit (MSB) is determined by the maximum attenuation amount. The minimum attenuation amount is obtained when each of the individual bits is on, while the maximum attenuation amount is obtained when each of individual bits is off. The minimum attenuation amount is referred to as a zero or reference state insertion loss of the attenuator.

As important performance items of the digital attenuator, there are accuracy of attenuation, an insertion loss, impedance matching at input and output ports, a power handling, a phase change, a size of the attenuator, facilitation of implementation of control circuit, etc.

Details of the important performance items of the digital attenuator are as follows. First, the accuracy of the attenuation of the digital attenuator implies degrees of error for each individual bit in a fixed attenuation amount within an operating frequency range. Normally, the accuracy of the attenuation is considered to be good when it is within ½ of the LSB.

The reference state insertion loss of the digital attenuator should be as low as possible. This is because the digital attenuator of low loss has many advantages in various aspects of power consumption, a circuit size, cost, and so on.

The input and output impedance matching of the digital attenuator should be very good so that the insertion loss and phase ripples are not issued within the operating frequency range when it is connected in series to a phase shifter or an amplifier. The input and output impedance matching of each individual attenuation bit affects overall performance of the attenuator. By mismatching of the individual bits, interference is taken place within an MMIC chip, thus deteriorating the amplitude and phase performance of the overall chip.

The power handling characteristic, as defined as Input $3^{rd}$ order Intercept Point (IIP3) in the attenuator, means linearity of the attenuator. Accordingly, the IIP3 should be high in order to use the attenuator in high power level.

A portion of systems such as a phase array antenna require that an insertion phase of the attenuator is not changed ideally for all attenuation states if possible.

In addition, when the size of the attenuator is smaller, it is more advantageous since its weight and cost can be reduced. A control circuit that is able to be simply implemented is preferred in terms of facilitation of implementation thereof as another important item.

As described above, the every important performance items cannot be satisfied simultaneously; and therefore, compromise is needed among those performance items. In order to satisfy the performance items as discussed early, various types of digital attenuators are proposed in many documents. Among them, there are disclosed "Distributed T Digital Attenuator" in U.S. Pat. No. 5,309,048; and "Switched Pi Digital Attenuator" in U.S. Pat. No. 5,448,207. Another prior art is "Switched T Digital Attenuator", as illustrated in FIG. 1. The operating frequency bands of these digital attenuators are all narrowband, which exist within 20 GHz, and accuracy of the attenuation is also lowered. A more detailed description thereon will be provided referring to FIG. 1.

FIG. 1 illustrates a structure of the conventional switched T digital attenuator.

As shown in FIG. 1, in the structure of the switched T digital attenuator, a first resistor 11, which is a resistive element for attenuating an input high frequency signal, is connected in series to an input port 16. A second resistor 12 is coupled in series between the first resistor 11 and an output port 17. And, a first switching device 14 is connected in parallel with the first and second resistors 11 and 12 between the input port 16 and the output port 17. A second switching device 15 and a third resistor 13 are connected in series between the first and second resistors 11 and 12, wherein the third resistor 13 is shorted to a ground.

In other words, in the switched T digital attenuator as shown in FIG. 1, if the first switching device 14 is shorted by a 1st voltage 18, which is a control voltage, and the second switching device 15 is opened by a voltage $\overline{1stvoltage}$ 19, the attenuator becomes a low loss state where the input signal is almost passed. On the other hand, if the first switching device 14 is opened and the second switching device 15 is shorted, the attenuator has a constant attenuation amount, which is mainly determined by the resistance values of the first, second and third resistors 11, 12 and 13. A difference value between the attenuation amount mainly determined by the resistance values of the first, second and third resistors 11, 12 and 13 and the above-described insertion loss in the low loss state indicates an attenuation amount varied by the 1st voltage 18 and the voltage $\overline{1stvoltage}$ 19, which are the control voltages. Here, the voltage $\overline{1stvoltage}$ 19 is the control voltage, which is indicative of an inverted voltage of the 1st voltage 18. Therefore, if the 1st voltage 18 is in a high level, the voltage $\overline{1stvoltage}$ 19 is in a low level, and vice versa.

Meanwhile, a T-type attenuator structure can be formed by the first, second and third resistors 11, 12 and 13 of resistive elements, which are remained after removing the switching devices 14 and 15 from the switched T digital attenuator as shown in FIG. 1. The following equation 1 represents resistance values of the resistive elements according to the attenuation amount in the T-type attenuator structure formed by the first, second and third resistors 11, 12 and 13 of the resistive elements.

$$R1 = \frac{10^{A/10}+1}{10^{A/10}-1}Z_0 - R3, \; R1 = R2, \; R3 = \frac{2\sqrt{z_0^2 10^{A/10}}}{10^{A/10}-1} \quad \text{Eq. (1)}$$

wherein A denotes an amount of attenuation (dB) and $Z_o$ indicates characteristic impedance of the input and output terminals of the attenuator.

The conventional switched T digital attenuator has problems in that an error between a preset attenuation amount and an actual attenuation amount is large, and the error therebetween becomes large as the frequency increases. The problems are occurred by capacitive coupling of intrinsic parasitic of the switching devices, which have frequency-dependent characteristic. Thus, these problems act as great limit factors in establishing a broadband of the digital switch and also in the accuracy of attenuation.

Consequently, in the conventional digital attenuators proposed in the above-described documents, the operating frequency bands are all narrowband, which are within 20 GHz, and the accuracy of the attenuation thereof is lowered.

DISCLOSURE

Technical Problem

It is, therefore, an object of the present invention to provide a digital attenuation apparatus having ultra broadband and excellent attenuation characteristics, which always maintains an input and output matching regardless of an amount of attenuation and allows a superior accuracy of attenuation with an operating frequency of ultra broadband. This is accomplished by inserting new transmission lines into a conventional switched T attenuation structure and then optimizing transmission line parameters therein and resistance values of resistive elements for attenuation.

Technical Solution

In accordance with the present invention, there is provided a digital attenuation apparatus having ultra broadband and excellent attenuation characteristics including: an input port for receiving a high frequency signal; a first transmission line connected in series to the input port for matching an input impedance of the apparatus; a second transmission line connected in series to the first transmission line; a first switching device connected to the second transmission line and controlled and switched by a second voltage from outside; a third transmission line connected in series to the first switching device for matching an output impedance of the apparatus; a first resistive element connected to the first transmission line; a second resistive element connected to the third transmission line; a fourth transmission line connected to the first and second resistive elements; a second switching device connected in series to the fourth transmission line and controlled and switched by a control voltage from the outside, which is indicative of an inverted voltage of the external voltage; a fifth transmission line connected in series to the second switching device; and a third resistive element connected in series to the fifth transmission line and shorted to a ground.

The other objectives and advantages of the invention will be understood by the following description and will also be appreciated by the embodiments of the invention more clearly. Further, the objectives and advantages of the invention will readily be seen that they can be realized by the means and its combination specified in the claims.

ADVANTAGEOUS EFFECTS

As mentioned above and below, the present invention has an advantage in that it has an ultra broadband and excellent attenuation accuracy characteristics by always maintaining the input and output matching, regardless of the attenuation amount, with the operating frequency band of the ultra broadband from DC to 40 GHz and by having the attenuation accuracy of 1 dB±0.3 dB, the attenuation resolution of 1 dB, and the attenuation dynamic range of 23 dB. This is accomplished by inserting new transmission lines into the conventional switched T attenuation structure and then optimizing transmission line parameters therein and resistance values of resistive elements for attenuation.

Furthermore, the present invention has an advantage in that since the 5-bit pseudomorphic HEMT (pHEMT) MMIC digital attenuation apparatus of the present invention has low insertion loss also in a high frequency, the power consumption of a wireless system adopting it can be reduced.

Moreover, the present invention has an advantage in that since the 5-bit pHEMT MMIC digital attenuation apparatus of the present invention performs the input and output matching very well, the wireless system adopting the same doesn't need any additional matching circuit, causes no characteristic changes of other circuits, and can reduce the size and weight.

DESCRIPTION OF DRAWINGS

The above and other objects and features of the present invention will become apparent from the following description of the preferred embodiments given in conjunction with the accompanying drawings, in which.

BEST MODE FOR THE INVENTION

The above-mentioned objectives, features, and advantages will be more apparent by the following detailed description in association with the accompanying drawings; and thus, the invention will be readily conceived by those skilled in the art to which the invention pertains. Further, in the following description, well-known arts will not be described in detail if it seems that they could obscure the invention in unnecessary detail. Hereinafter, a preferred embodiment of the present invention will be set forth in detail with reference to the accompanying drawings.

Figure 2:
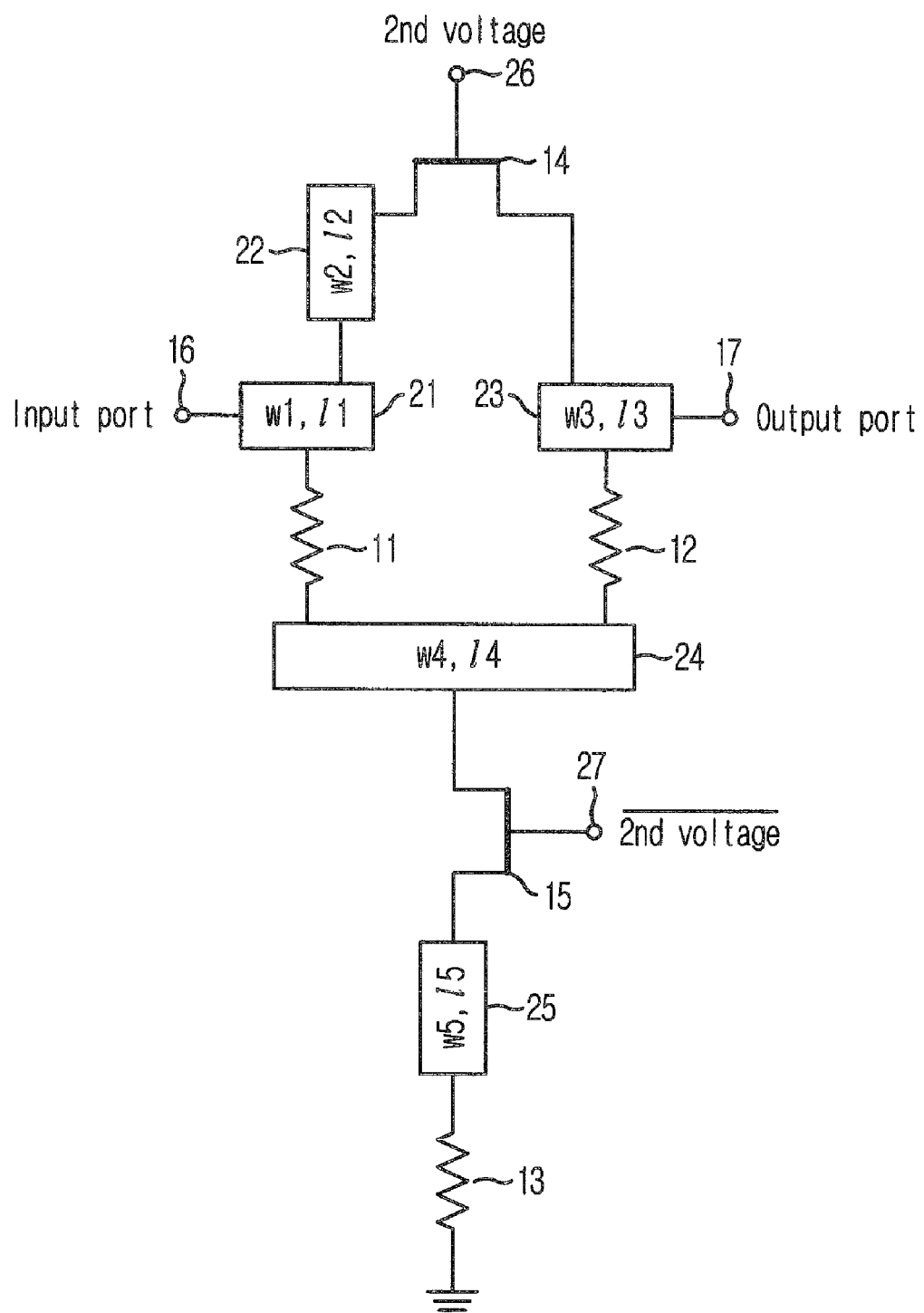
FIG. 2 is a view illustrating a structure of a digital attenuation apparatus having ultra broadband and excellent attenuation characteristics in accordance with an embodiment of the present invention.

FIG. 2 is a view illustrating a configuration of a digital attenuation apparatus having ultra broadband and excellent attenuation characteristics in accordance with an embodiment of the present invention.

Figure 1:
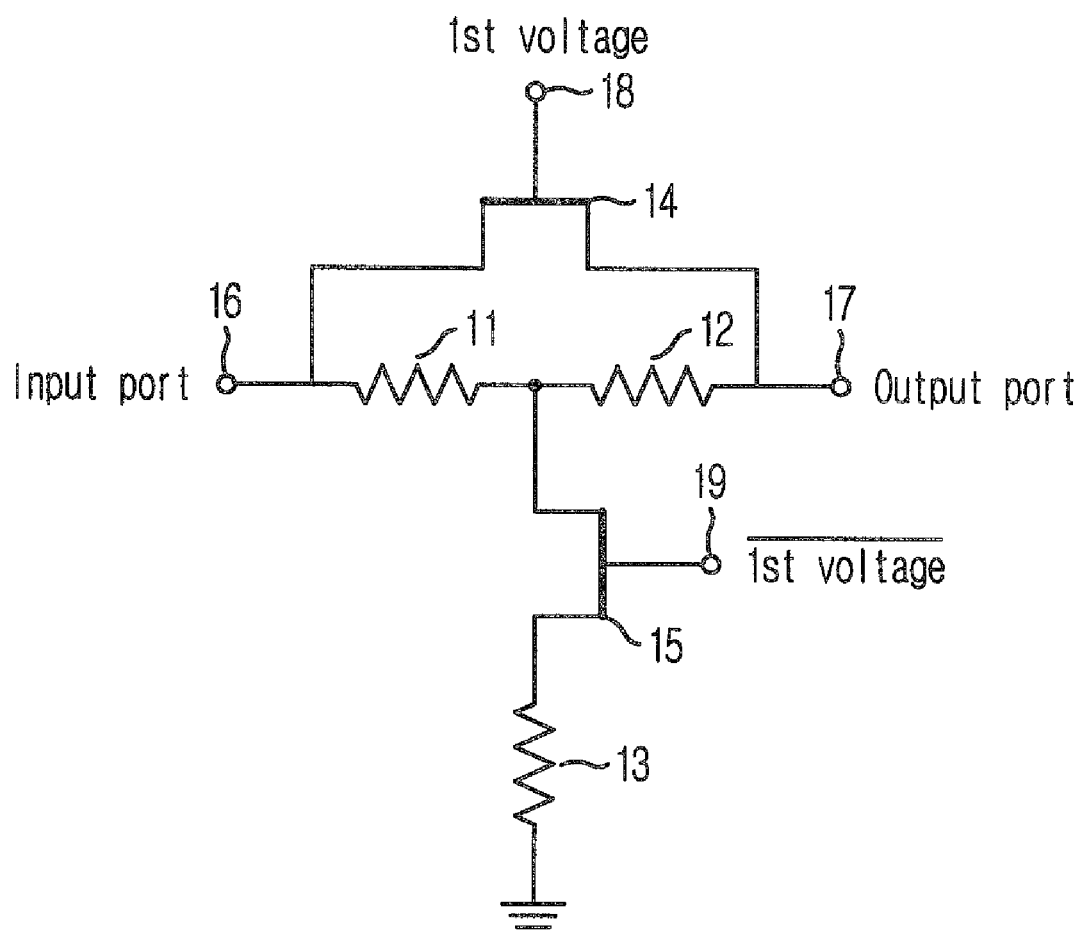
FIG. 1 shows a structure of the conventional switched T digital attenuator.

As shown in FIG. 2, the inventive digital attenuation apparatus has a structure that a plurality of transmission lines are newly added to the conventional switched T digital attenuator shown in FIG. 1.

That is, the inventive digital attenuation apparatus includes an input port 16 for receiving a high frequency signal, a first transmission line 21 connected in series with the input port 16 for matching an input impedance of the digital attenuation apparatus and connecting a second transmission line 22 to a first resistor 11, the second transmission line 22 connected in series with the first transmission line 21 for connecting a first switching device 14 to the first transmission line 21, the first switching device 14 connected between the second transmission line 22 and a third transmission line 23 and switched in response to a 2nd voltage 26, the third transmission line 23 connected in series with the first switching device 14 for matching an output impedance of the digital attenuation apparatus and connecting an output port 17 to a second resistor 12, a fourth transmission line 24 connected between the first resistor 11 and the second resistor 12 for connecting the first and second resistors 11 and 12 to a second switching device 15, the second switching device 15 connected in series with the fourth transmission line 24 and switched in response to a voltage $\overline{2ndvoltage}$ 27 for connecting the fourth transmission line 24 to a fifth transmission line 25, the fifth transmission line 25 connected in series with the second switching device 15 for connecting a third resistor 13 to the second switching device 15, and the third resistor 13 connected in series with the fifth transmission line 25 and shorted to a ground. As mentioned above, the 2nd voltage 26 is a voltage to control the first switching device 14, while the voltage $\overline{2ndvoltage}$ 27 is a voltage to control the second switching device 15. The voltage $\overline{2ndvoltage}$ 27 indicates an inverted voltage of the 2nd voltage 26; and therefore, if the 2nd voltage 26 is in a high level, the voltage $\overline{2ndvoltage}$ 27 is in a low level, and vice versa.

As the switching device shown in FIG. 2, there is utilized a pHEMT, which is a kind of transistor. A gate length of the pHEMT is 0.15 μm. The performance limit of the pHEMT switch in the high frequency is caused by parasitic components such as gate-source capacitance, drain-gate capacitance or the like in the device. It is known that a width of the gate of pHEMT should be wide in order to achieve high linearity and low loss, whereas it should be narrow in order to obtain the broadband characteristic. These requirements cannot be satisfied simultaneously, so that a compromise is somewhat needed in a design of the digital attenuation apparatus.

In FIG. 2, the switching devices 14 and 15 are implemented with pHEMTs, which are kind of transistor, but are not limited to them.

In designing of the digital attenuation apparatus in accordance with the present invention as shown in FIG. 2, a pHEMT having a gate of 200 μm width is adopted as the first switching device 14 being a serial switching device, thereby minimizing the insertion loss of the apparatus. Also, a pHEMT having a gate of 50 μm width is used as the second switching device 15 being a short switching device, thereby allowing the apparatus to have the broadband characteristic.

In addition, the digital attenuation apparatus of the present invention has the excellent attenuation accuracy and ultra broadband frequency characteristics by optimizing parameters of the newly added first to fifth transmission lines 21 to 25, and the resistance values of the resistive elements.

In other words, in order for the digital attenuation apparatus of FIG. 2 to have the accurate attenuation, broadband and excellent reflection loss characteristics, the resistance values of the first to third resistors 11 to 13, and widths and lengths of the first to fifth transmission lines 21 to 25 are optimized. As shown in FIG. 2, variables used for the performance optimization are the resistance values of the first to third resistors 11 to 13, the widths w1 to w5 and the lengths 11 to 15 of the first to fifth transmission lines 21 to 25.

In the following embodiment, there will be illustratively described a 5-bit pHEMT MMIC digital attenuation apparatus having 1 dB attenuation resolution and 23 dB attenuation operating range. But, it should be noted that the present invention is not limited to the above example.

In order to implement the 5-bit pHEMT MMIC digital attenuation apparatus having 1 dB attenuation resolution and 23 dB attenuation operating range, there are required five attenuation bits, that are 1 dB, 2 dB and 4 dB bit, and two 8 dB bits. If the single attenuation apparatus structure as shown in FIG. 2 has an 8 dB attenuation amount, a preset attenuation amount is large. However, due to many coupling by the parasitic capacitance of the first switching device 14 being the serial switching device, it is difficult to obtain a desired attenuation amount, which lowers the attenuation accuracy, and makes the operating frequency bandwidth narrow.

Therefore, 8 dB bit consist of cascaded two 4 dB bits so that the 8 dB bit allows the broadband and excellent attenuation accuracy characteristics. The digital attenuation apparatus of the present invention shown in FIG. 2 is applied to all the attenuation bits used in the 5-bit pHEMT MMIC digital attenuation apparatus in accordance with an embodiment of the present invention.

Table 1 below indicates an example of optimized resistance values, widths and lengths of the transmission lines with respect to 1 dB, 2 dB and 4 dB bits constituting the 5-bit pHEMT MMIC digital attenuation apparatus in accordance with an embodiment of the present invention.

TABLE 1

| Parameters | Bit size | | |
|---|---|---|---|
| | 1 dB | 2 dB | 4 dB |
| First resistor = second resistor (ohm) | 3.3557 | 6.7265 | 13.7124 |
| Third resistor (ohm) | 370 | 182.5 | 84.1667 |
| w1 (μm) | 33 | 23 | 40 |
| w2 (μm) | 81.5 | 79.5 | 104 |
| w3 (μm) | 25 | 20 | 20 |
| w4 (μm) | 33 | 23 | 40 |
| w5 (μm) | 30 | 30 | 30 |
| l1 (μm) | 134 | 96.5 | 44.75 |
| l2 (μm) | 25 | 25 | 40 |
| l3 (μm) | 161.5 | 153 | 52 |

TABLE 1-continued

| Parameters | Bit size | | |
|---|---|---|---|
| | 1 dB | 2 dB | 4 dB |
| l4 (μm) | 159 | 121.5 | 84.75 |
| l5 (μm) | 10 | 65 | 65 |

Figure 3:
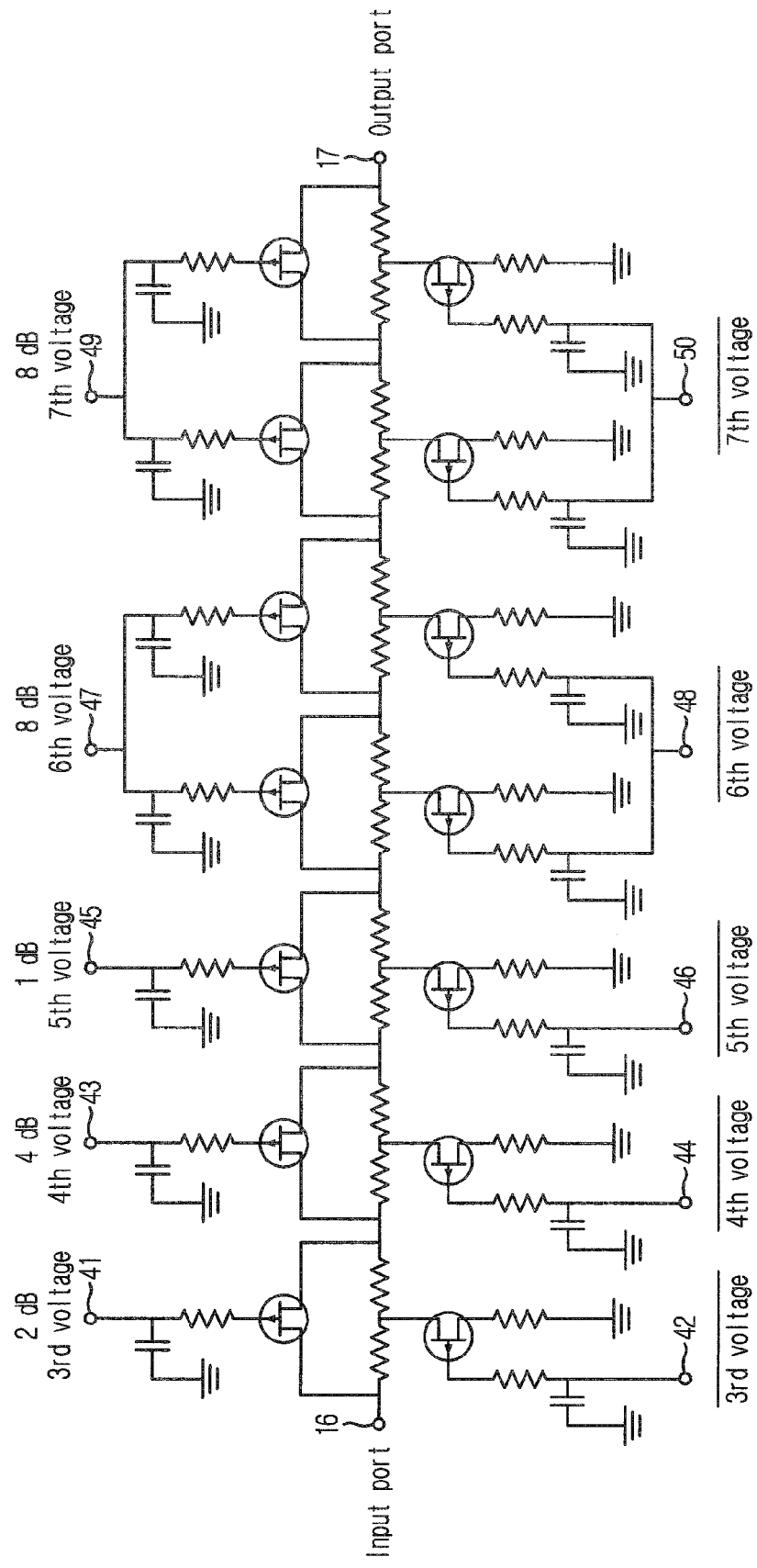
FIG. 3 presents an overall circuit diagram of a 5-bit pHEMT MMIC digital attenuation apparatus having ultra broadband and excellent attenuation characteristics in accordance with an embodiment of the present invention.

FIG. 3 presents an overall circuit diagram of the 5-bit pHEMT MMIC digital attenuation apparatus having ultra broadband and excellent attenuation characteristics in accordance with an embodiment of the present invention.

As shown in FIG. 3, the 5-bit pHEMT MMIC digital attenuation apparatus in accordance with the present invention is designed in such a way that a 2 dB bit is located at a first stage and 4 dB, 1 dB, 8 dB and 8 dB bits are located in that order. In FIG. 3, the transmission lines as shown in FIG. 2 are omitted for simplicity. In addition, the inventive 5-bit pHEMT MMIC digital attenuation apparatus employs microstrip lines as the transmission lines and Thin Film Resistors (TFRs) as the resistive elements. Reference numbers 41 through 50 indicate voltages, respectively.

Figure 4:
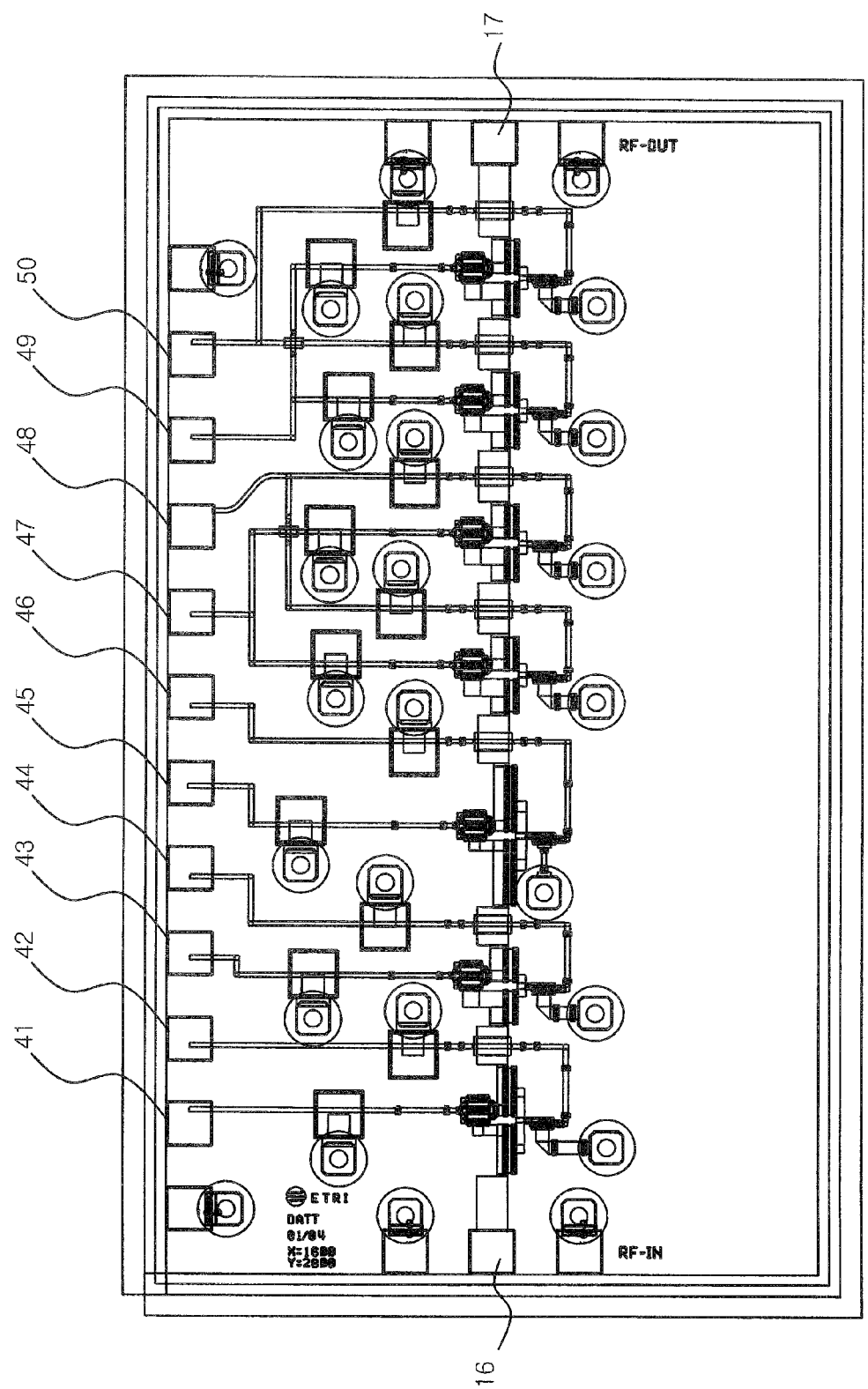
FIG. 4 illustrates a layout of a 5-bit pHEMT MMIC digital attenuation apparatus having ultra broadband and excellent attenuation characteristics in accordance with an embodiment of the present invention.

FIG. 4 illustrates a layout of the 5-bit pHEMT MMIC digital attenuation apparatus having ultra broadband and excellent attenuation characteristics in accordance with an embodiment of the present invention.

As illustrated therein, in a 5-bit pHEMT MMIC digital attenuation apparatus chip having ultra broadband and excellent attenuation characteristics, input and output ports are arranged at both ends of the chip, respectively, and 5 pairs of complementary control signal (control voltage) lines are placed on one side of the chip. It is set that the size of the chip is 1.6 mm×2.8 mm and the width of GaAs substrate of the chip is 100 μm.

Scattering matrix parameters (S-parameters) are measured in an on-wafer state with respect to the 5-bit pHEMT MMIC digital attenuation apparatus manufactured as shown in FIG. 4. These scattering parameters are measured with respect to 24 attenuation states. The following Table 2 represents a truth table for controlling the 5-bit pHEMT MMIC digital attenuation apparatus of the present invention. In Table 2 below, $V_{High}$ indicates a control voltage of −2 V and $V_{Low}$ denotes a control voltage of 0 V.

TABLE 2

| 2 dB | | 4 dB | | 1 dB | | 8 dB | | 8 dB | | Attenuation at |
|---|---|---|---|---|---|---|---|---|---|---|
| $3^{rd}$ vol | 3rd vol | $4^{th}$ vol | 4th vol | $5^{th}$ vol | 5th vol | $6^{th}$ vol | 6th vol | $7^{th}$ vol | 7th vol | input-output ports |
| $V_{Low}$ | $V_{High}$ | $V_{Low}$ | $V_{High}$ | $V_{Low}$ | $V_{High}$ | $V_{Low}$ | $V_{High}$ | $V_{Low}$ | $V_{High}$ | Reference state insertion loss |
| $V_{Low}$ | $V_{High}$ | $V_{Low}$ | $V_{High}$ | $V_{High}$ | $V_{Low}$ | $V_{Low}$ | $V_{High}$ | $V_{Low}$ | $V_{High}$ | 1 dB |
| $V_{High}$ | $V_{Low}$ | $V_{Low}$ | $V_{High}$ | $V_{Low}$ | $V_{High}$ | $V_{Low}$ | $V_{High}$ | $V_{Low}$ | $V_{High}$ | 2 dB |
| $V_{Low}$ | $V_{High}$ | $V_{High}$ | $V_{Low}$ | $V_{Low}$ | $V_{High}$ | $V_{Low}$ | $V_{High}$ | $V_{Low}$ | $V_{High}$ | 4 dB |
| $V_{Low}$ | $V_{High}$ | $V_{Low}$ | $V_{High}$ | $V_{Low}$ | $V_{High}$ | $V_{High}$ | $V_{Low}$ | $V_{Low}$ | $V_{High}$ | 8 dB |
| $V_{Low}$ | $V_{High}$ | $V_{Low}$ | $V_{High}$ | $V_{Low}$ | $V_{High}$ | $V_{Low}$ | $V_{High}$ | $V_{High}$ | $V_{Low}$ | 8 dB |
| $V_{High}$ | $V_{Low}$ | $V_{High}$ | $V_{Low}$ | $V_{High}$ | $V_{Low}$ | $V_{High}$ | $V_{Low}$ | $V_{High}$ | $V_{Low}$ | 23 dB |

Figure 5:
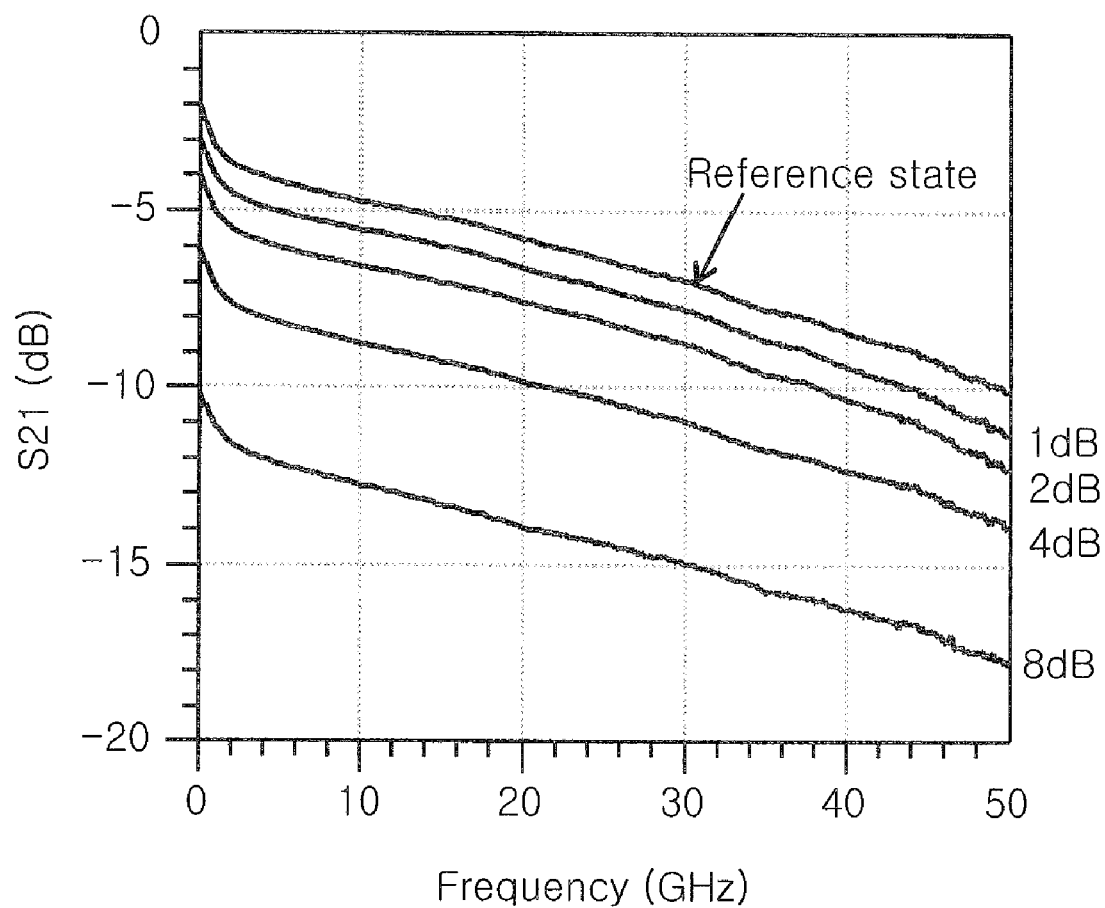
FIG. 5 is a view showing an insertion loss of a 5-bit pHEMT MMIC digital attenuation apparatus having ultra broadband and excellent attenuation characteristics in accordance with an embodiment of the present invention.

FIG. 5 is a view showing an insertion loss of the 5-bit pHEMT MMIC digital attenuation apparatus having ultra broadband and excellent attenuation characteristics in accordance with an embodiment of the present invention.

That is, FIG. 5 shows measured values of the insertion losses of a reference state and cases of setting 1 dB, 2 dB, 4 dB and 8 dB. In FIG. 5, a difference between the insertion losses of the reference state and a case of setting 1 dB has 1 dB attenuation characteristic. In the same manner, attenuation characteristics of 2 dB, 4 dB and 8 dB can also be obtained.

As shown in FIG. 5, the insertion loss of the reference state is 6 dB at 20 GHz and 8 dB at 40 GHz. Accordingly, it can be seen that since the inventive 5-bit pHEMT MMIC digital attenuation apparatus has low insertion loss also in a high frequency, the power consumption of a wireless system incorporating it can be reduced.

Figure 6:
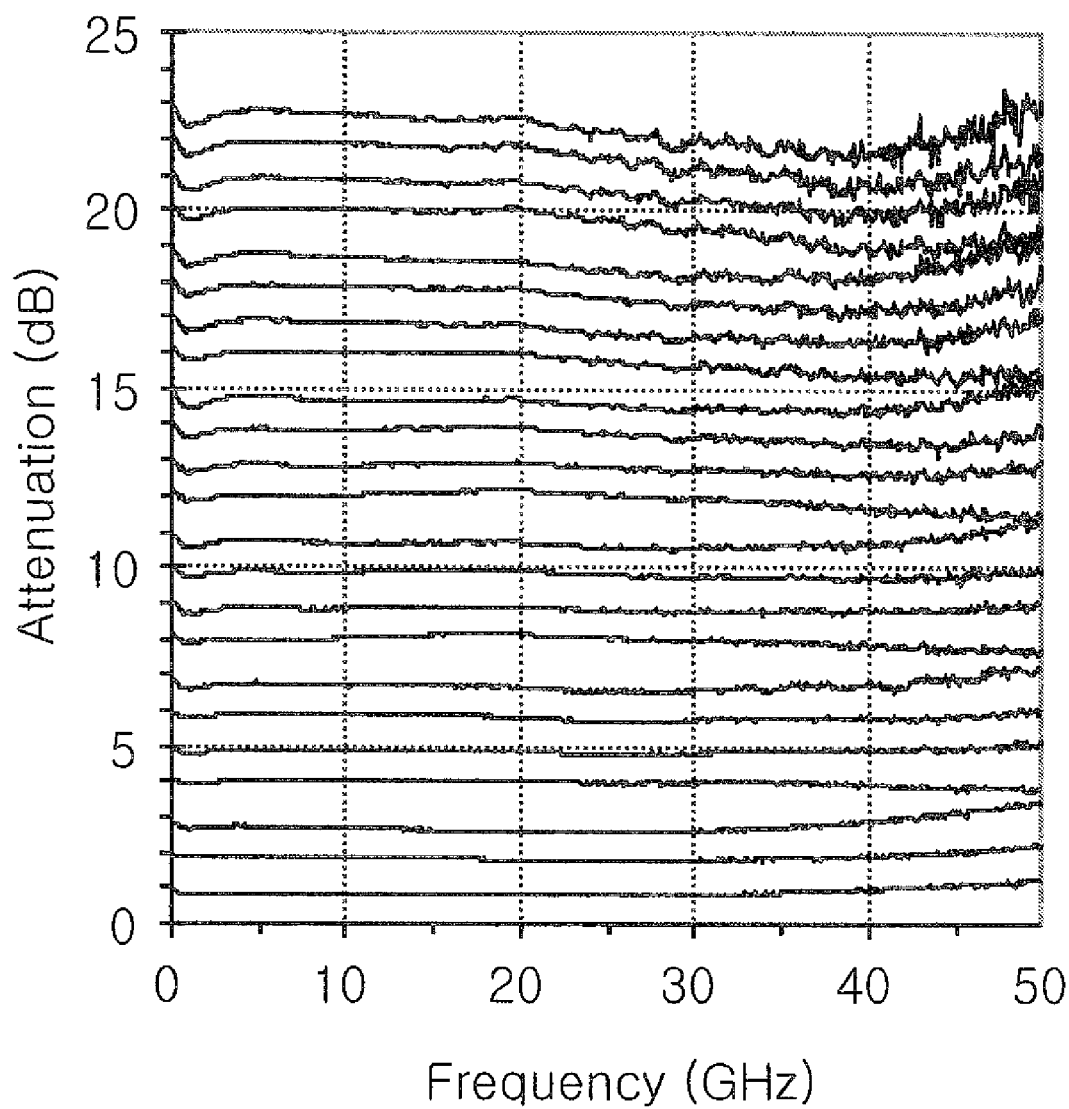
FIG. 6 is a waveform diagram showing an attenuation characteristic of a 5-bit pHEMT MMIC digital attenuation apparatus having ultra broadband and excellent attenuation characteristics in accordance with an embodiment of the present invention.

FIG. 6 is a waveform diagram showing an attenuation characteristic of the 5-bit pHEMT MMIC digital attenuation apparatus having ultra broadband and excellent attenuation characteristics in accordance with an embodiment of the present invention.

As shown in FIG. 6, the attenuation accuracy of the inventive 5-bit pHEMT MMIC digital attenuation apparatus is 1.0±0.3 dB in a 40 GHz frequency band and a 23 dB attenuation range. The attenuation resolution is 1 dB and the overall attenuation amount is 23 dB in a range from DC to 20 GHz and 22 dB in a range from DC to 40 GHz. Therefore, the present invention has an ultra broadband frequency bandwidth from DC to 40 GHz and also very high attenuation accuracy in a broad attenuation range of 23 dB, compared to the attenuation characteristic of the conventional digital attenuation apparatus shown in FIG. 2. Accordingly, it can be found that the operating frequency bandwidth of the inventive digital attenuation apparatus is much broadbanded.

Figure 7:
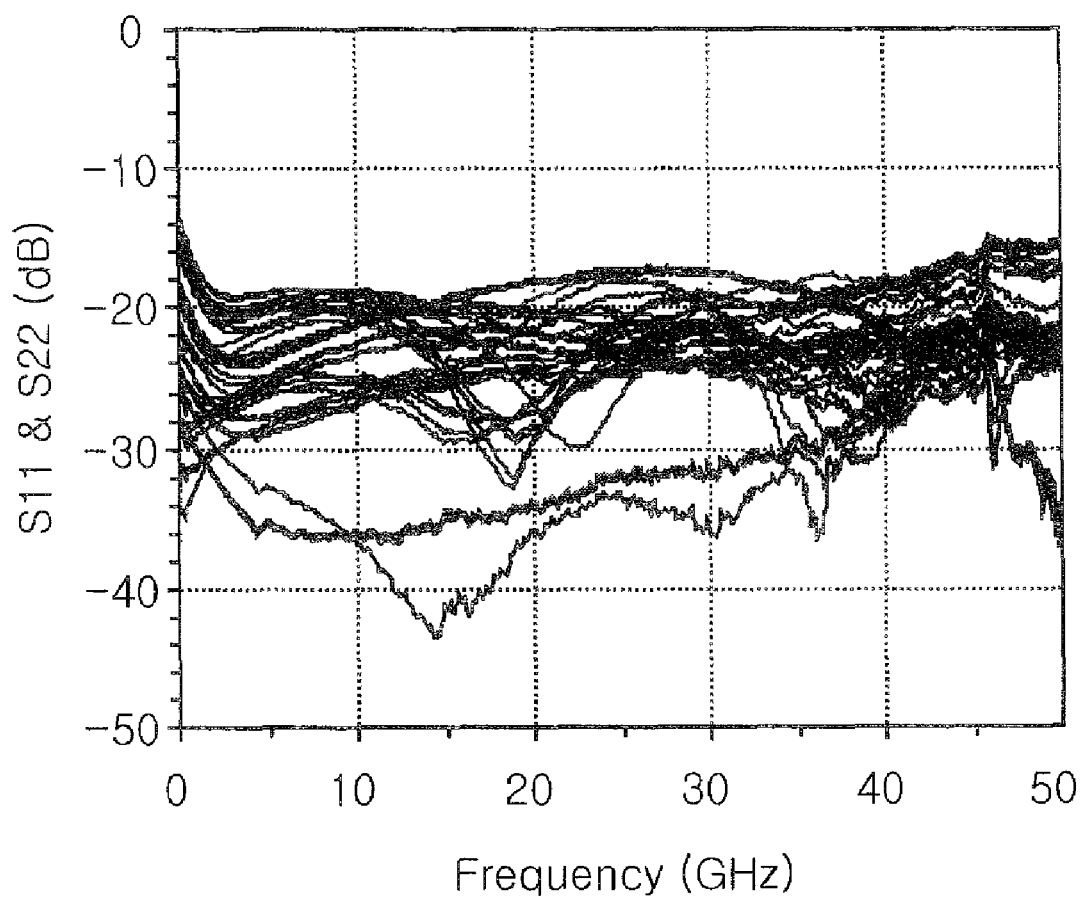
FIG. 7 is a waveform diagram showing a reflection characteristic of a 5-bit pHEMT MMIC digital attenuation apparatus having ultra broadband and excellent attenuation characteristics in accordance with an embodiment of the present invention.

FIG. 7 is a waveform diagram showing a reflection characteristic of the 5-bit pHEMT MMIC digital attenuation apparatus having ultra broadband and excellent attenuation characteristics in accordance with an embodiment of the present invention.

Especially, FIG. 7 shows reflection coefficients at the input and output ports of the inventive 5-bit pHEMT MMIC digital attenuation apparatus with respect to total 24 attenuation states. The reflection losses at the input and output terminates are 14 dB or more in a range from DC to 2 GHz and 17 dB or more in a range from 2 GHz to 40 GHz. Namely, because the inventive 5-bit pHEMT MMIC digital attenuation apparatus conducts the input and output matching very well, it can be seen that the wireless system adopting the same doesn't any additional matching circuit, causes no characteristic changes of other circuits, and can reduce the size and weight.

The present application contains subject matter related to Korean patent application No. 2005-0085903, filed in the Korean Intellectual Property Office on Sep. 14, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A digital attenuation apparatus comprising:
a high frequency input means for receiving a high frequency signal;
a first transmission means connected in series to the high frequency input means for matching an input impedance of the apparatus;
a second transmission means connected in series to the first transmission means;
a first switching means connected to the second transmission means and controlled and switched by a second voltage from outside;
a third transmission means connected in series to the first switching means for matching an output impedance of the apparatus;
a first resistive element connected to the first transmission means;
a second resistive element connected to the third transmission means;
a fourth transmission means connected to the first and second resistive elements;
a second switching means connected in series to the fourth transmission means and controlled and switched by a control voltage from the outside, which is indicative of an inverted voltage of the second voltage;
a fifth transmission means connected in series to the second switching means; and
a third resistive element connected in series to the fifth transmission means and shorted to a ground.

2. The digital attenuation apparatus as recited in claim 1, wherein the attenuation, broadband and reflection loss characteristics of the apparatus are adjusted depending on widths and lengths of the first to fifth transmission means.

3. The digital attenuation apparatus as recited in claim 2, wherein the first to fifth transmission means are microstrip lines.

4. The digital attenuation apparatus as recited in claim 1, wherein the first to third resistive elements are thin film resistors.

5. The digital attenuation apparatus as recited in claim 1, wherein the first switching means is a pseudomorphic High Electron Mobility Transistor (pHEMT) serial switching device having a gate width of 200 μm such that an insertion loss of the apparatus decreases as the gate width becomes smaller.

6. The digital attenuation apparatus as recited in claim 1, wherein the second switching means is a pHEMT short switching device having a gate width of 50 μm such that the apparatus has a broadband characteristic as the gate width becomes smaller.

7. The digital attenuation apparatus as recited in claim 1, wherein each of the first and second switching means is a pHEMT having a gate length of 0.15 μm.

8. The digital attenuation apparatus as recited in claim 1, wherein the first to fifth resistive elements and the widths and lengths of and the first to fifth transmission means are values as follows:

|  | Bit size | | |
| --- | --- | --- | --- |
| Parameters | 1 dB | 2 dB | 4 dB |
| First resistive element = second resistive element (ohm) | 3.3557 | 6.7265 | 13.7124 |
| Third resistive element (ohm) | 370 | 182.5 | 84.1667 |
| Width of first transmission means (μm) | 33 | 23 | 40 |
| Width of second transmission means (μm) | 81.5 | 79.5 | 104 |
| Width of third transmission means (μm) | 25 | 20 | 20 |
| Width of fourth transmission means (μm) | 33 | 23 | 40 |

-continued

| Parameters | Bit size | | |
|---|---|---|---|
| | 1 dB | 2 dB | 4 dB |
| Width of fifth transmission means (μm) | 30 | 30 | 30 |
| Length of first transmission means (μm) | 134 | 96.5 | 44.75 |
| Length of second transmission means (μm) | 25 | 25 | 40 |
| Length of third transmission means (μm) | 161.5 | 153 | 52 |
| Length of fourth transmission means (μm) | 159 | 121.5 | 84.75 |
| Length of fifth transmission means (μm) | 10 | 65 | 65. |

9. A digital attenuation apparatus comprising:
a plurality of digital attenuation apparatuses, each being recited in claim 1, cascaded and impedance-matched to obtain a desired attenuation amount.

10. The digital attenuation apparatus as recited in claim 9, wherein each of the plurality of the digital attenuation apparatuses is a 5-bit pHEMT Monolithic Microwave Integrated Circuit (MMIC) digital attenuation apparatus.

11. The digital attenuation apparatus as recited in claim 10, wherein the 5-bit pHEMT MMIC digital attenuation apparatus includes attenuation devices of 5 bits, which are cascaded with each other and have attenuation amounts of 2 dB, 4 dB, 1 dB, 8 dB and 8 dB, respectively.

12. The digital attenuation apparatus as recited in claim 11, wherein the digital attenuation apparatus having the attenuation amount of 8 dB is implemented by cascading two 4 dB bits circuits in series to obtain the broadband characteristic.

13. The digital attenuation apparatus as recited in claim 11, wherein the 5-bit pHEMT MMIC digital attenuation apparatus is controlled based on control voltages ($V_{High}=-2$ V, $V_{Low}=0$ V) for adjusting attenuation amounts as follows:

| 2 dB | | 4 dB | | 1 dB | | 8 dB | | 8 dB | | Attenuation at |
|---|---|---|---|---|---|---|---|---|---|---|
| $3^{rd}$ vol | 3rd vol | $4^{th}$ vol | 4th vol | $5^{th}$ vol | 5th vol | $6^{th}$ vol | 6th vol | $7^{th}$ vol | 7th vol | input-output ports |
| $V_{Low}$ | $V_{High}$ | $V_{Low}$ | $V_{High}$ | $V_{Low}$ | $V_{High}$ | $V_{Low}$ | $V_{High}$ | $V_{Low}$ | $V_{High}$ | Reference state insertion loss |
| $V_{Low}$ | $V_{High}$ | $V_{Low}$ | $V_{High}$ | $V_{High}$ | $V_{Low}$ | $V_{Low}$ | $V_{High}$ | $V_{Low}$ | $V_{High}$ | 1 dB |
| $V_{High}$ | $V_{Low}$ | $V_{Low}$ | $V_{High}$ | $V_{Low}$ | $V_{High}$ | $V_{Low}$ | $V_{High}$ | $V_{Low}$ | $V_{High}$ | 2 dB |
| $V_{Low}$ | $V_{High}$ | $V_{High}$ | $V_{Low}$ | $V_{Low}$ | $V_{High}$ | $V_{Low}$ | $V_{High}$ | $V_{Low}$ | $V_{High}$ | 4 dB |
| $V_{Low}$ | $V_{High}$ | $V_{Low}$ | $V_{High}$ | $V_{Low}$ | $V_{High}$ | $V_{High}$ | $V_{Low}$ | $V_{Low}$ | $V_{High}$ | 8 dB |
| $V_{Low}$ | $V_{High}$ | $V_{Low}$ | $V_{High}$ | $V_{Low}$ | $V_{High}$ | $V_{Low}$ | $V_{High}$ | $V_{High}$ | $V_{Low}$ | 8 dB |
| $V_{High}$ | $V_{Low}$ | $V_{High}$ | $V_{Low}$ | $V_{High}$ | $V_{Low}$ | $V_{High}$ | $V_{Low}$ | $V_{High}$ | $V_{Low}$ | 23 dB. |

\* \* \* \* \*